United States Patent
Spence

[19]

[11] Patent Number: 6,079,742
[45] Date of Patent: Jun. 27, 2000

[54] TIRE CHANGING SYSTEM WITH FRAME MOUNTED JACKS AND LUG WRENCH

[76] Inventor: Roy Spence, 241 Church Ave., Brooklyn, N.Y. 11226

[21] Appl. No.: 09/150,478

[22] Filed: Sep. 9, 1998

Related U.S. Application Data

[63] Continuation-in-part of application No. 08/751,579, Nov. 18, 1996, abandoned.

[51] Int. Cl.$^7$ ............................................. B60S 9/12
[52] U.S. Cl. ............... 280/766.1; 254/423; 81/57.11; 280/763.1
[58] Field of Search ................ 81/57.11, 57.12, 81/57.13, 57.14; 280/766.1, 763.1, 764.1, 765.1, 762; 254/418, 423, 424, 425

[56] References Cited

U.S. PATENT DOCUMENTS

| | | | |
|---|---|---|---|
| D. 348,966 | 7/1994 | Guyton | D34/31 |
| 2,704,952 | 3/1955 | Mooter | 81/57.11 |
| 3,888,464 | 6/1975 | Felsen | 254/425 |
| 3,977,278 | 8/1976 | Jackson | 81/57.11 |
| 4,597,584 | 7/1986 | Hanser | 254/423 |
| 4,605,086 | 8/1986 | Marom | 254/418 |
| 4,635,904 | 1/1987 | Whittingham | 254/425 |
| 5,188,379 | 2/1993 | Krause et al. | 280/6.12 |
| 5,575,492 | 11/1996 | Stone | 280/475 |

*Primary Examiner*—Brian L. Johnson
*Assistant Examiner*—Avraham H. Lerner

[57] ABSTRACT

A tire changing system with frame mounted jacks and lug wrench comprising a vehicle having a plurality of wheels and a frame with a pair of longitudinal lower supports horizontally situated on a lower surface thereof adjacent to sides thereof; four housings each having a horizontally oriented upper extent, a vertically oriented intermediate extent integrally coupled perpendicularly to an edge of the first horizontally extent, and a horizontally oriented open lower extent; four jacks coupled to the upper extent of an associated housing, each having an extended position upon the receipt of a raise signal for raising an associated wheel above the ground and a retracted position upon the receipt of a lower signal for lowering an associated wheel to the ground thus allowing normal operation thereof; and a control mechanism for allowing a user to selectively transmit to the jacks the raise signal and the lower signal.

5 Claims, 5 Drawing Sheets

TIRE CHANGING SYSTEM WITH FRAME MOUNTED JACKS AND LUG WRENCH

RELATED APPLICATION

This application is a continuation-in-part of U.S. patent application Ser. No. 08/751,579 filed Nov. 18, 1996 now abandoned, the subject matter of which is incorporated herein by reference.

BACKGROUND OF THE INVENTION

1. Field of the Invention

The present invention relates to a tire changing system with frame mounted jacks and lug wrench and more particularly pertains to allowing a driver of a vehicle to conveniently change a tire.

2. Description of the Prior Art

The use of leveling systems is known in the prior art. More specifically, leveling systems heretofore devised and utilized for the purpose of leveling a recreational vehicle are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,188,379 to Krause et al; U.S. Pat. No. 4,597,584 to Hanser; U.S. Pat. No. Des. 348,966 to Guyton; U.S. Pat. No. 4,142,710 to Okuda; U.S. Pat. No. Des. 349,386 to Piebenga; and U.S. Pat. No. Des. 254,129 to Johnson.

In this respect, the tire changing system with frame mounted jacks and lug wrench according to the present invention substantially departs from the conventional concepts and designs of the prior art, and in so doing provides an apparatus primarily developed for the purpose of allowing a driver of a vehicle to conveniently change a tire.

Therefore, it can be appreciated that there exists a continuing need for a new and improved tire changing system with frame mounted jacks and lug wrench which can be used for allowing a driver of a vehicle to conveniently change a tire. In this regard, the present invention substantially fulfills this need.

SUMMARY OF THE INVENTION

In view of the foregoing disadvantages inherent in the known types of leveling systems now present in the prior art, the present invention provides an improved tire changing system with frame mounted jacks and lug wrench. As such, the general purpose of the present invention, which will be described subsequently in greater detail, is to provide a new and improved tire changing system with frame mounted jacks and lug wrench which has all the advantages of the prior art and none of the disadvantages.

To attain this, the present invention essentially comprises a new and improved tire changing system with frame mounted jacks and lug wrench comprising, in combination, a vehicle having a plurality of wheels and a frame with a pair of longitudinal lower supports horizontally situated on a lower surface thereof adjacent to sides thereof; four housings each with a rectilinear box-shaped configuration having a horizontally oriented upper extent, vertically oriented intermediate extents integrally coupled perpendicularly to an edge of the first horizontally extent, and a horizontally oriented open lower extent, the lower extent having a plurality of flanges with apertures formed therein for allowing the coupling of one of the housings to a longitudinal lower support of the vehicle adjacent each wheel thereof; four jacks coupled to the upper extent of an associated housing through a plurality of bolts and each having an extended position upon the receipt of a raise signal for raising an associated wheel above the ground and a retracted position upon the receipt of a lower signal for lowering an associated wheel to the ground thus allowing normal operation thereof, each jack having a plurality of cylindrical members nestable one within the other and situated about a vertical axis with a circular plate integrally coupled to a bottom end thereof, a hydraulic opening situated perpendicularly to a side of the top cylindrical member adjacent the upper extent thereof coupled to a source of hydraulic fluid, each jack having apertures formed therein for coupling with an associated housing and with springs coupling the circular plate and top of the upper extent of the top cylindrical member to urge the cylindrical members to a retracted position within an associated housing; an electric lug wrench with a T-shaped configuration having a nut engagement portion for engaging lug nuts of the wheels of the vehicle, a trigger for effecting rotation of the lug nuts, and an elongated power cord with a length equal to that of the vehicle for coupling with a power source; a control mechanism for allowing a user to selectively transmit to the jacks the raise signal and the lower signal, the control mechanism including a housing situated within the lug wrench four actuation keys situated on the housing each having a first orientation to transmit a lower signal and a second orientation to transmit a raise signal, and a master actuation key also situated on the housing having a first orientation for allowing transmission of the raise signal and lower signal and transmission of power to the lug wrench only upon the vehicle being deactivated and a second orientation for precluding the transmission of the raise signal and lower signal and the transmission of power to the lug wrench; and pivotal braces secured to frame adjacent to the tires to preclude inadvertent dropping of a portion of the vehicle after a jack has been activated.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tire changing system with frame mounted jacks and lug wrench which has all the advantages of the prior art leveling systems and none of the disadvantages.

It is another object of the present invention to provide a new and improved tire changing system with frame mounted jacks and lug wrench which may be easily and efficiently manufactured and marketed.

It is a further object of the present invention to provide a new and improved tire changing system with frame mounted jacks and lug wrench which is of a durable and reliable construction.

An even further object of the present invention is to provide a new and improved tire changing system with frame mounted jacks and lug wrench which is susceptible of a low cost of manufacture with regard to both materials and labor, and which accordingly is then susceptible of low prices of sale to the consuming public, thereby making such tire changing system with frame mounted jacks and lug wrench economically available to the buying public.

Still yet another object of the present invention is to provide a new and improved tire changing system with frame mounted jacks and lug wrench which provides in the apparatuses and methods of the prior art some of the advantages thereof, while simultaneously overcoming some of the disadvantages normally associated therewith.

Still another object of the present invention is to allow a driver of a vehicle to conveniently change a tire.

Lastly, it is an object of the present invention to provide a new and improved tire changing system with frame mounted jacks and lug wrench comprising a vehicle having a plurality of wheels and a frame with a pair of longitudinal lower supports horizontally situated on a lower surface thereof adjacent to sides thereof; four housings each having a horizontally oriented upper extent, a vertically oriented intermediate extent integrally coupled perpendicularly to an edge of the first horizontally extent, and a horizontally oriented open lower extent; four jacks coupled to the upper extent of an associated housing, each having an extended position upon the receipt of a raise signal for raising an associated wheel above the ground and a retracted position upon the receipt of a lower signal for lowering an associated wheel to the ground thus allowing normal operation thereof; and a control mechanism for allowing a user to selectively transmit to the jacks the raise signal and the lower signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
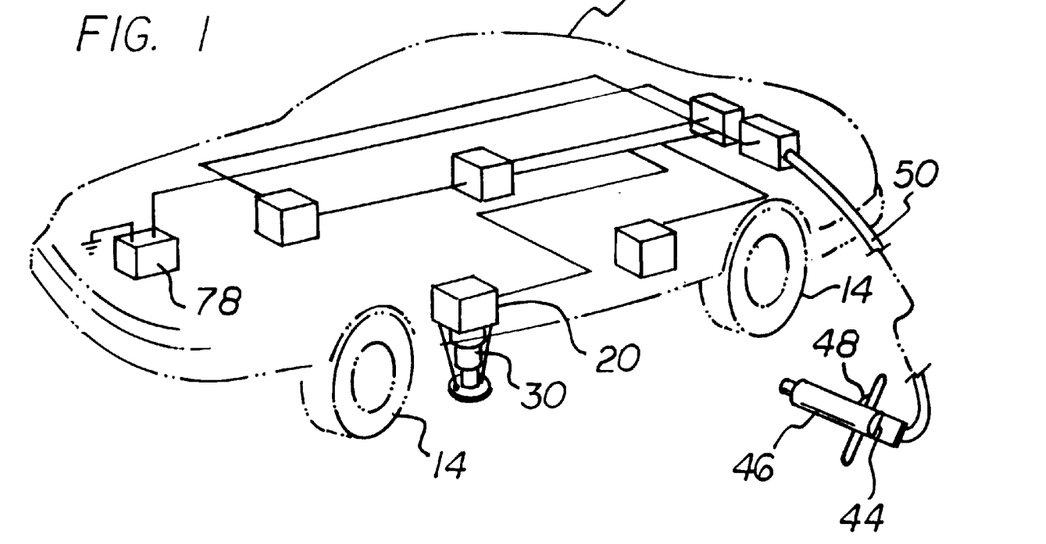
FIG. 1 is a perspective illustration of the preferred embodiment of the tire changing system with frame mounted jacks, one being lowered, and lug wrench constructed in accordance with the principles of the present invention.

With reference now to the drawings, and in particular to FIG. 1 thereof, a new and improved tire changing system with frame mounted jacks and lug wrench embodying the principles and concepts of the present invention and generally designated by the reference numeral 10 will be described.

The present invention, the new and improved tire changing system with frame mounted jacks and lug wrench, is comprised of a plurality of components. Such components in their broadest context include a plurality of brackets, jacks, a lug wrench and a control mechanism. Such components are individually configured and correlated with respect to each other so as to attain the desired objective.

More specifically, it will be noted that the system 10 of the present invention includes a vehicle 12 having a plurality of wheels 14 and a frame 16. As shown in FIG. 1, the frame has a pair of longitudinal lower supports 18 horizontally situated on a lower surface thereof adjacent to sides thereof.

Figure 3:
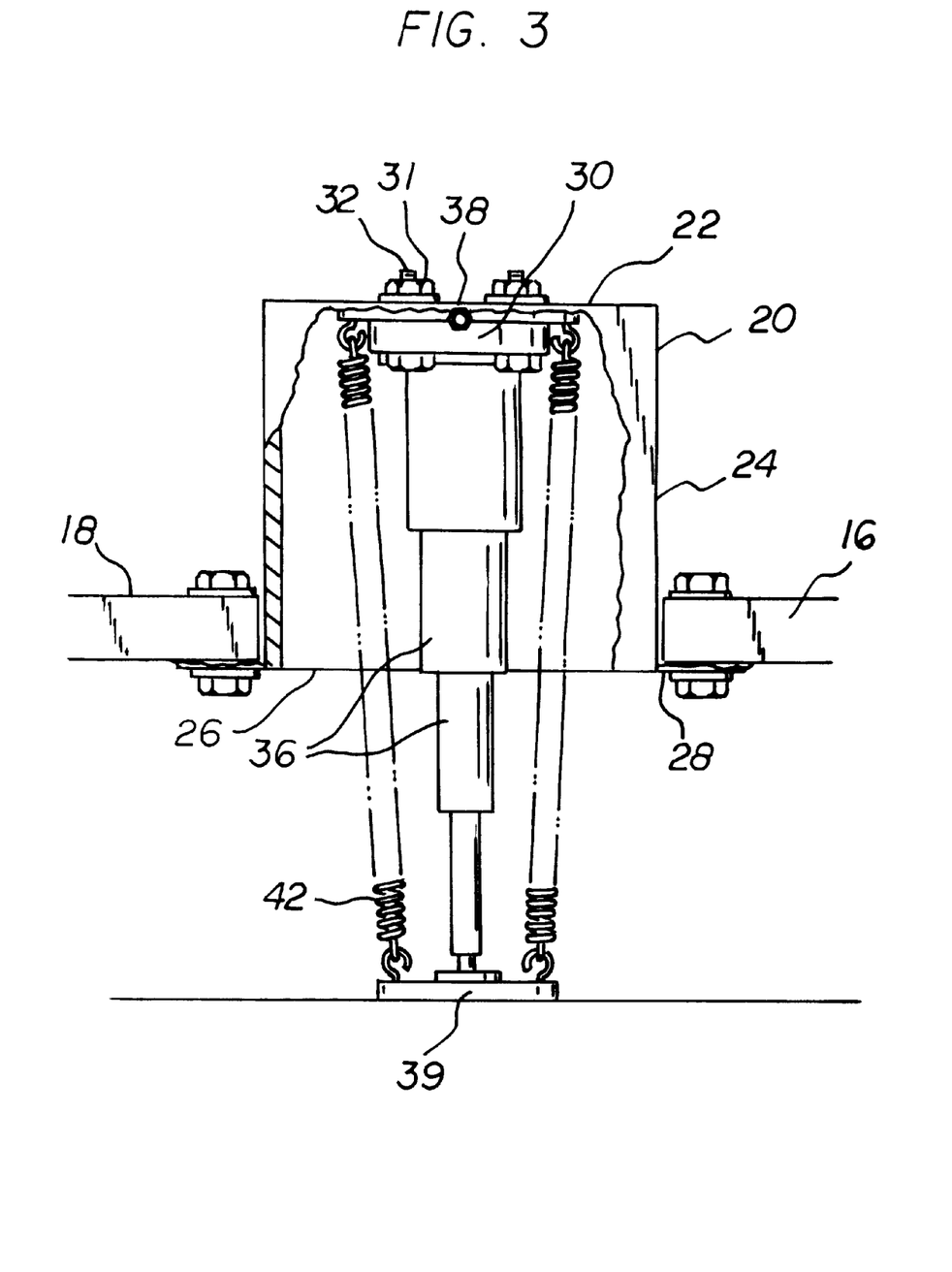
FIG. 3 is a side elevational view of one of a housing and an associated jack.

Further provided are four housings 20. Each housing has a rectilinear box-shaped configuration with a horizontally oriented upper extent 22. Each housing also has four vertically oriented intermediate extents 24 integrally coupled perpendicularly to an edge of the first horizontally extent. Each housing also has a horizontally oriented open lower extent 26. The lower extent has a plurality of flanges 28 with apertures formed therein. The apertures are for allowing the coupling of one of the housings to a longitudinal lower support of the vehicle by nuts and bolts. The four housings are located adjacent to each wheel of the vehicle.

Next provided are four jacks 30. Each jack is coupled to the upper extent of an associated housing. The coupling is through a plurality of nuts 31 and bolts 32. Each jack has an extended position upon the receipt of a raise signal for raising an associated wheel above the ground. Each jack also has a retracted position upon the receipt of a lower signal for lowering an associated wheel to the ground thus allowing normal operation thereof.

Figure 5:
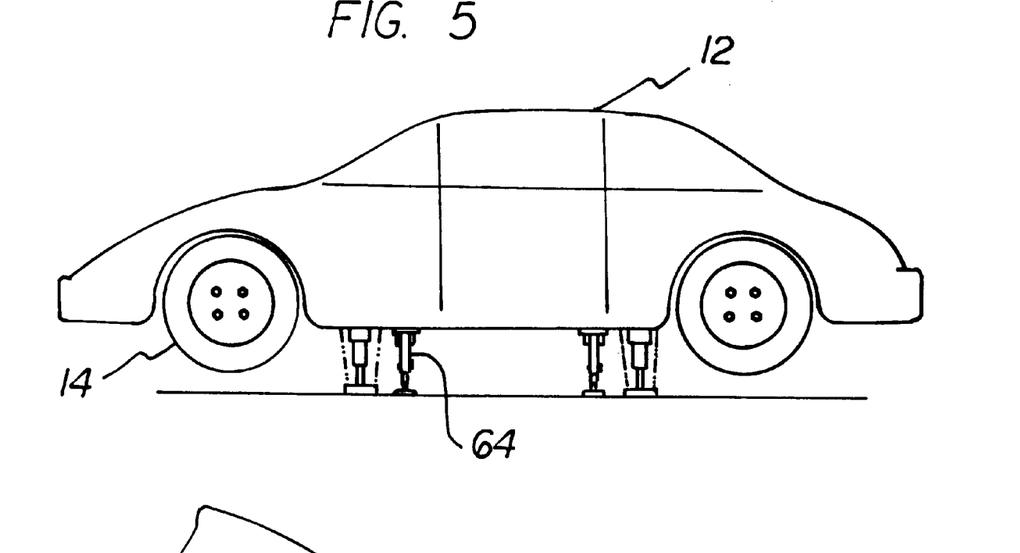
FIG. 5 is a side view of the shafts of the jacks in the extended position thereof.

Each jack has a plurality of cylindrical members 36 nestable one within the other. The nestable members are situated about a vertical axis. A circular plate 39 is integrally coupled to a bottom end of the jack for contacting the ground.

A hydraulic opening 38 is formed perpendicularly to a side of the top cylindrical member adjacent the upper extent thereof and is coupled to a source of hydraulic fluid. Each jack also has apertures 40 formed therein for coupling with an associated housing through nuts and bolts. In addition, springs 42 couple the circular plate and top of the upper extent of the top cylindrical member to urge the cylindrical members to a retracted position within an associated housing.

In a retracted orientation, the lowermost cylindrical member is retracted into the next adjacent cylindrical member and such two members are retracted into the cylindrical member thereabove. The three lower most cylindrical members are then nested into the topmost cylindrical member. The springs coupling the upper and lower extents of the cylindrical members effect the retracting and nesting of the cylindrical members when no pressurized fluid is within the cylinders. Upon the application of pressurized hydraulic fluid into any jack, the cylindrical members will move with respect to each other to the extended operative position as shown against the urging of the springs.

Figure 6:
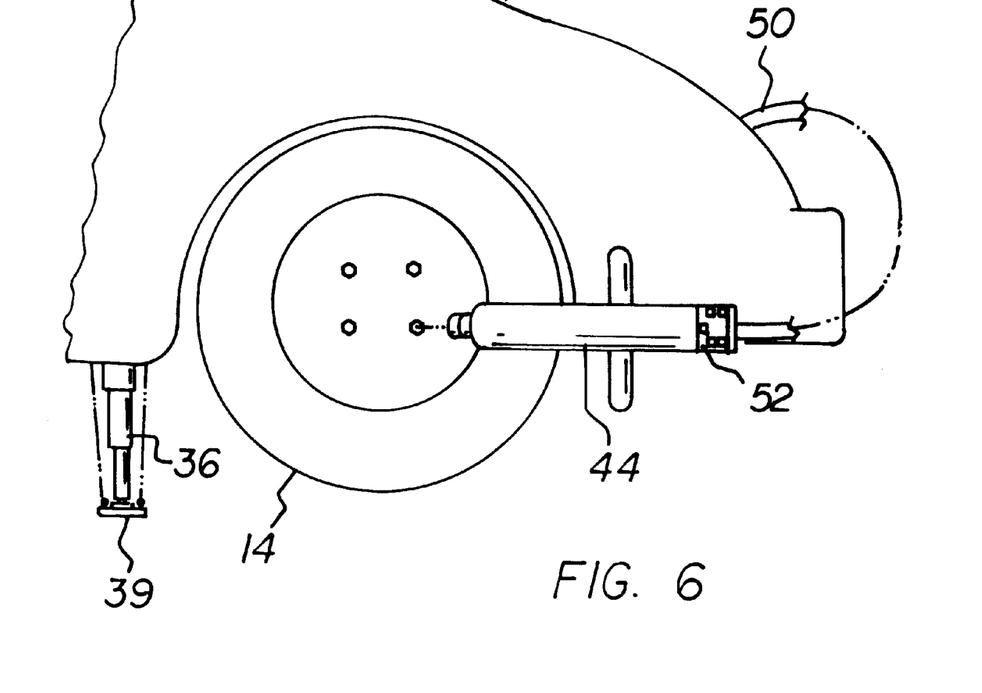
FIG. 6 is a close-up view of the lug wrench of the present invention in use.
Figure 7:
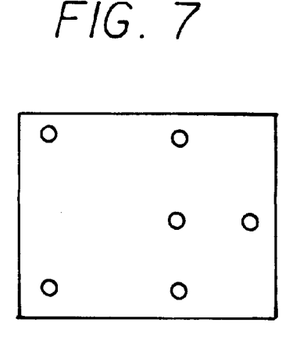
FIG. 7 is a top elevational view of the safety braces seen in FIG. 3.
Figure 8:
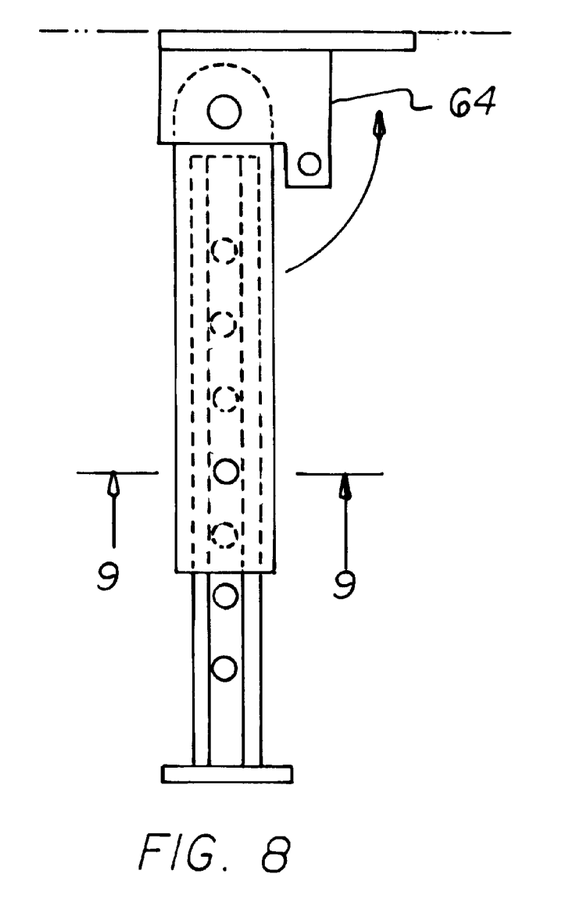
FIG. 8 is a side elevational view of the safety brace of FIG. 7.
Figure 9:
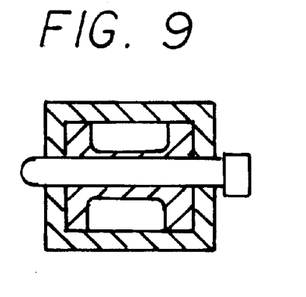
FIG. 9 is a cross sectional view taken along line 9—9 of FIG. 8.
Figure 10:
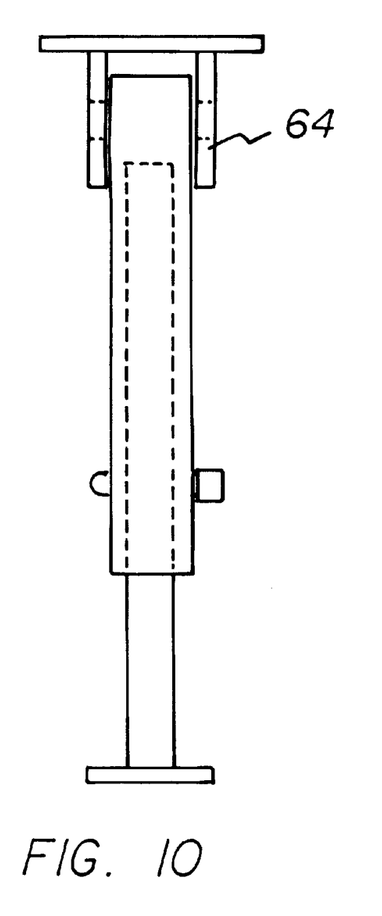
FIG. 10 is a front elevational view of the safety brace of FIGS. 3 and 7–9.

Also provided is an electric lug wrench 44. The lug wrench is formed with a T-shaped configuration. It has a main body portion with a nut engagement portion 46 for engaging lug nuts of the wheels of the vehicle. It also has a trigger 48 for effecting rotation of the lug nuts. The main body portion has two outwardly extending handles with the trigger thereon for ease of operation and with a control panel thereon. Lastly, the lug wrench includes an elongated power cord 50 with a length equal to that of the vehicle for coupling with a power source.

Figure 2:
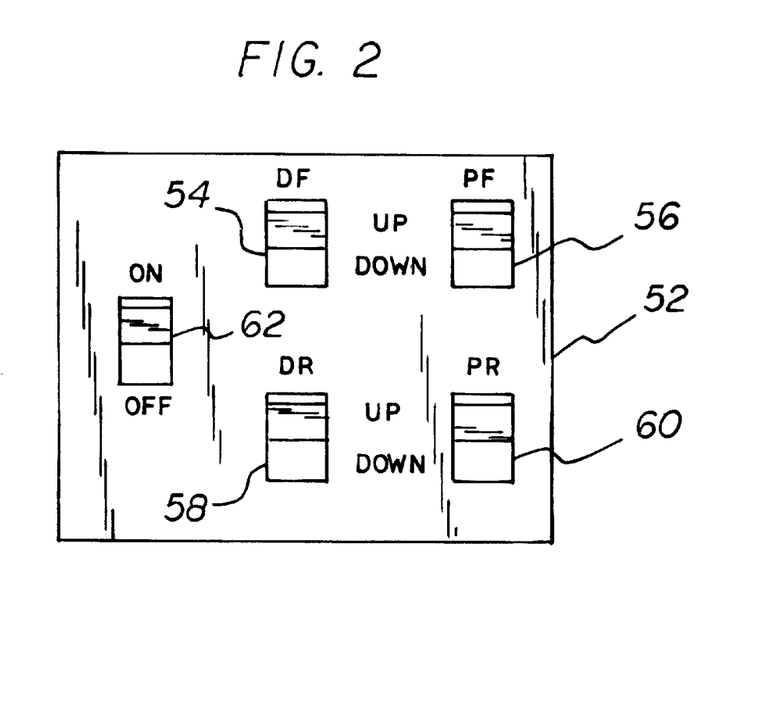
FIG. 2 is a front view of a portion of the jack showing the control mechanism and keys thereof.

The control mechanism 52 on the wrench are for allowing a user to selectively transmit to the jacks the raise signal and the lower signal. The control mechanism includes a housing situated within the lug wrench with four actuation keys 54, 56, 58, 60 situated on the housing. Each key has a first orientation to transmit a lower signal and a second orientation to transmit a raise signal. Additionally, a master actuation key 62 is also situated on the housing having a first orientation for allowing transmission of the raise signal and lower signal and transmission of power to the lug wrench only upon the vehicle being deactivated and a second orientation for precluding the transmission of the raise signal and lower signal and the transmission of power to the lug wrench. A light 63 indicates that the power is on.

Additional safety is effected through four pivotal braces 64. Such braces are secured to the frame adjacent to the tires to preclude inadvertent dropping of a portion of the vehicle after a jack has been activated. Each brace is bolted to the frame adjacent to a jack and includes an upper plate with downwardly extending apertured supports an upper cylinder has upper apertures with a pivot pin coupling the supports and cylinder. A locking hole is formed in the cylinder. A lower cylinder with aligned locking holes is positioned within the upper cylinder. After the jack has lifted one corner of the vehicle, the brace is pivoted downwardly and the lower cylinder is extended. Thereafter, a pin is inserted through the locking holes of the cylinders to preclude the vehicle from dropping and damaging the vehicle in the event of a malfunction of the hydraulic system.

Figure 4:
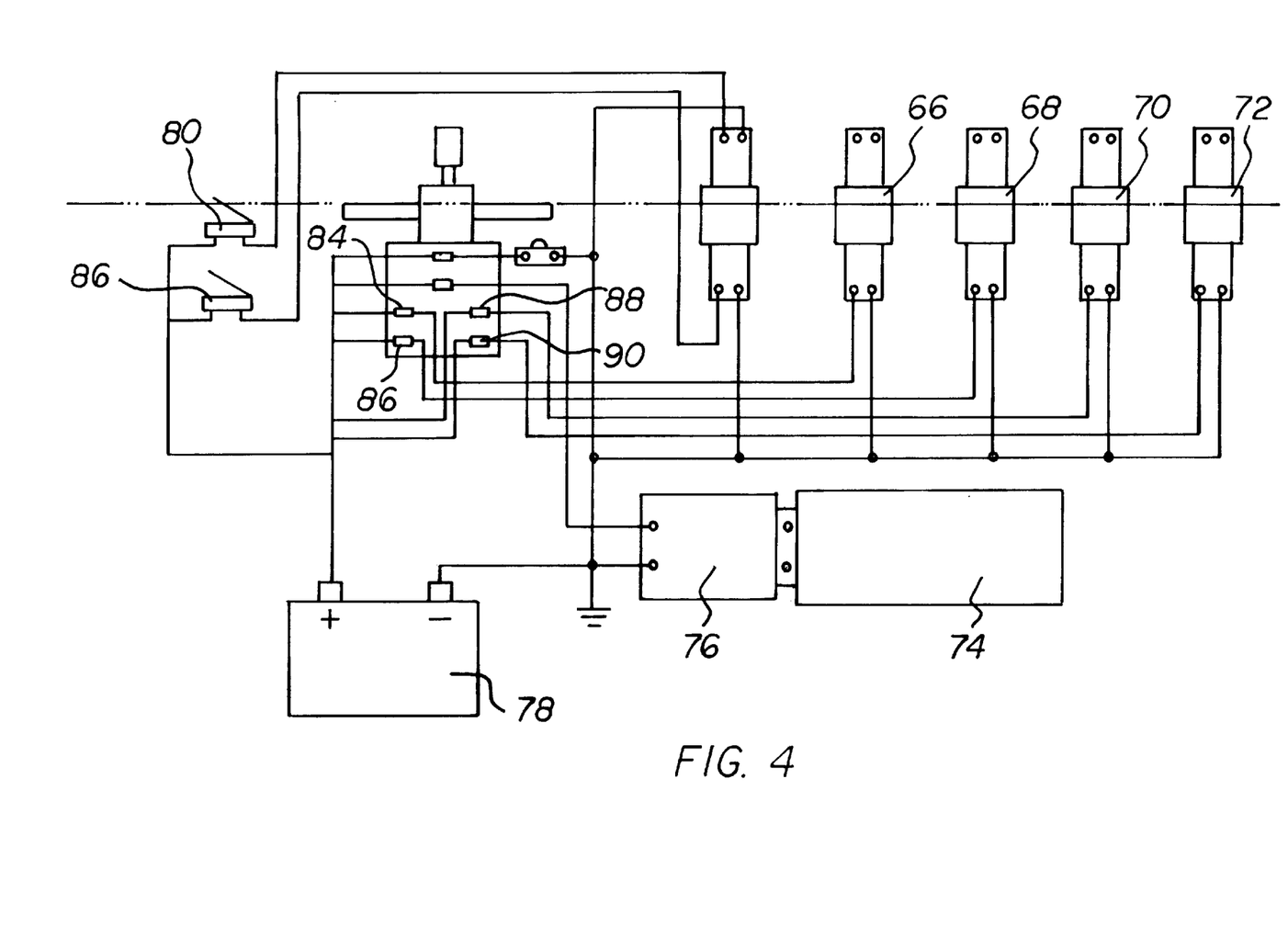
FIG. 4 is a schematic illustration of drive and control elements of the system of the present invention.

The control mechanism 56 is best understood by reference to FIG. 4. In the upper right are four valves for individually activating the four jacks and include, a lift driver/front valve 66, a lift driver/rear valve 68, a lift passenger/front valve 70 and a lift passenger/rear valve 72. Thereadjacent is a wrench valve for driving the wrench. Beneath the valves are the hydraulic fluid reservoir 74 and hydraulic pump motor 76. To the left is the vehicle battery 78 which is conventional except for its coupling to the system of the present invention.

To the left are a wrench loosen switch 80 and a wrench tighten switch 82. Therebetween are the lug wrench with the light and light switch and hydraulic pump motor switch therebeneath. Lastly shown are a lift driver/front switch 84, a lift driver/rear switch 86, a lift passenger/front switch 88 and a lift passenger/rear switch 90. The control mechanisms are located on the lug wrench which is positionable in the trunk of the vehicle with, preferably, the source of pneumatic fluid and the pump for such fluid.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tire changing system with frame mounted jacks and lug wrench comprising, in combination:

a vehicle having a plurality of wheels and a frame with a pair of longitudinal lower supports horizontally situated on a lower surface thereof adjacent to sides thereof;

four housings each with a rectilinear box-shaped configuration having a horizontally oriented upper extent, vertically oriented intermediate extents integrally coupled perpendicularly to an edge of the first horizontally extent, and a horizontally oriented open lower extent, the lower extent having a plurality of flanges with apertures formed therein for allowing the coupling of one of the housings to a longitudinal lower support of the vehicle adjacent each wheel thereof;

four jacks coupled to the upper extent of an associated housing through a plurality of bolts and each having an extended position upon the receipt of a raise signal for raising an associated wheel above the ground and a retracted position upon the receipt of a lower signal for lowering an associated wheel to the ground thus allowing normal operation thereof, each jack having a plurality of cylindrical members nestable one within the other and situated about a vertical axis with a circular plate integrally coupled to a bottom end thereof, a hydraulic opening situated perpendicularly to a side of the top cylindrical member adjacent the upper extent thereof coupled to a source of hydraulic fluid, each jack having apertures formed therein for coupling with an associated housing and with springs coupling the circular plate and top of the upper extent of the top cylindrical member to urge the cylindrical members to a retracted position within an associated housing;

an electric lug wrench with a T-shaped configuration having a nut engagement portion for engaging lug nuts of the wheels of the vehicle, a trigger for effecting rotation of the lug nuts, and an elongated power cord with a length equal to that of the vehicle for coupling with a power source;

a control mechanism for allowing a user to selectively transmit to the jacks the raise signal and the lower signal, the control mechanism including a housing situated within the lug wrench, four actuation keys situated on the housing each having a first orientation to transmit a lower signal and a second orientation to transmit a raise signal, and a master actuation key also situated on the housing having a first orientation for allowing transmission of the raise signal and lower signal and transmission of power to the lug wrench only upon the vehicle being deactivated and a second orientation for precluding the transmission of the raise signal and lower signal and the transmission of power to the lug wrench; and pivotal braces secured to the frame adjacent to the tires to preclude inadvertent dropping of a portion of the vehicle after a jack has been activated.

2. A tire changing system with frame mounted jacks and lug wrench comprising:

a vehicle having a plurality of wheels and a frame with a pair of longitudinal lower supports horizontally situated on a lower surface thereof adjacent to sides thereof;

four housings each having a horizontally oriented upper extent, a vertically oriented intermediate extent integrally coupled perpendicularly to an edge of the first horizontally extent, and a horizontally oriented open lower extent;

four jacks coupled to the upper extent of an associated housing, each having an extended position upon the receipt of a raise signal for raising an associated wheel above the ground and a retracted position upon the receipt of a lower signal for lowering an associated wheel to the ground thus allowing normal operation thereof;

an electric lug wrench with a T-shaped configuration having a nut engagement portion for engaging lug nuts of the wheels of the vehicle, a trigger for effecting rotation of the lug nuts, and an elongated power cord with a length equal to that of the vehicle for coupling with a power source; and a control mechanism for allowing a user to selectively transmit to the jacks the raise signal and the lower signal, the control mechanism including a housing situated within the lug wrench, four actuation keys situated on the housing each having a first orientation to transmit a lower signal and a second orientation to transmit a raise signal, and a master actuation key also situated on the housing having a first orientation for allowing transmission of the raise signal and lower signal and transmission of power to the lug wrench only upon the vehicle being deactivated and a second orientation for precluding the transmission of the raise signal and lower signal and the transmission of power to the lug wrench.

3. A tire changing system with frame mounted jacks and lug wrench as set forth in claim 2 wherein each jack has a plurality of cylindrical members nestable one within the other and situated about a vertical axis and a circular plate integrally coupled to a bottom end thereof, a hydraulic motor mechanism situated perpendicularly to a side of the top cylindrical member adjacent the upper extent thereof coupled to a source of hydraulic fluid with apertures formed in corners thereof for coupling with an associated housing and springs coupling the circular plate and top of the upper extent of the top cylindrical member to urge the cylindrical members to a retracted position within a housing.

4. A tire changing system with frame mounted jacks and lug wrench as set forth in claim 2 and further including pivotal braces secured to the frame adjacent to the tires to preclude inadvertent dropping of a portion of the vehicle after a jack has been activated.

5. A tire changing system with frame mounted jacks and lug wrench comprising:

a vehicle having a plurality of wheels and a frame with a pair of longitudinal lower supports horizontally situated on a lower surface thereof adjacent to sides thereof;

four housings each having a horizontally oriented upper extent, a vertically oriented intermediate extent integrally coupled perpendicularly to an edge of the first horizontal extent, and a horizontally oriented open lower extent;

four jacks coupled to the upper extent of an associated housing, each having an extended position upon the receipt of a raise signal for raising an associated wheel above the ground and a retracted position upon the receipt of a lower signal for lowering an associated wheel to the around thus allowing normal operation thereof;

a lug wrench having a lug engaging portion with a trigger for rotation of the lug nuts and with means for coupling the lug wrench to a power source; and a control mechanism for allowing a user to selectively transmit to the jacks the raise signal and the lower signal, the control mechanism including a housing situated within the lug wrench, four actuation keys situated on the housing each having a first orientation to transmit a lower signal and a second orientation to transmit a raise signal, and a master actuation key also situated on the housing having a first orientation for allowing transmission of the raise signal and lower signal and transmission of power to the lug wrench only upon the vehicle being deactivated and a second orientation for precluding the transmission of the raise signal and lower signal and the transmission of power to the lug wrench.

* * * * *

UNITED STATES PATENT AND TRADEMARK OFFICE
CERTIFICATE OF CORRECTION

| | |
|---|---|
| PATENT NO. | : 6,079,742 |
| DATED | : June 27, 2000 |
| INVENTOR(S) | : Roy Spence |

It is certified that error appears in the above-identified patent and that said Letters Patent is hereby corrected as shown below:

<u>Title page,</u>
Item [76], the inventor's address should be corrected to read
-- 2411 Church Ave.,
  Brooklyn, N.Y. 11226 --

Signed and Sealed this

Twenty-third Day of October, 2001

Attest:

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,079,742
DATED : June 27, 2000
INVENTOR(S) : Roy Spence

It is certified that error appears in the above-identified patent and that said Letters Patent is hereby corrected as shown below:

Title page,
Inventor's address is incorrectly shown, please insert -- 2411 -- in place of "241".

Signed and Sealed this

Thirtieth Day of October, 2001

Attest:

*Nicholas P. Godici*

NICHOLAS P. GODICI
*Attesting Officer*     *Acting Director of the United States Patent and Trademark Office*